United States Patent
Evans et al.

[11] Patent Number: 5,394,789
[45] Date of Patent: Mar. 7, 1995

[54] MANUALLY OPERABLE DEVICE FOR METERING AIR THROUGH A VALVE SYSTEM FOR DRAWING INTO, RETAINING AND EVACUATING MATERIAL FROM A CHAMBER

[76] Inventors: John P. Evans, 7814 Marion La., Bethesda, Md. 20814; Robert H. Evans, 1092 W. Buffalo St., Warsaw, N.Y. 14569

[21] Appl. No.: 87,533

[22] Filed: Jul. 8, 1993

[51] Int. Cl.⁶ .................... A47J 37/10; A47J 43/28
[52] U.S. Cl. .................. 99/345; 99/472; 99/484; 99/495; 141/22; 141/24; 141/26; 222/209; 222/400.8
[58] Field of Search ................ 99/345–347, 99/456, 472, 495, 484; 141/22–26, 65; 222/209, 401, 400.8; 220/231; 215/260, 262, 311

[56] References Cited

U.S. PATENT DOCUMENTS

| | | | |
|---|---|---|---|
| 947,468 | 1/1910 | Fish | 222/400.8 |
| 2,652,765 | 9/1953 | Risco | 99/345 |
| 2,669,176 | 2/1954 | Lazerus | 99/472 |
| 2,887,035 | 5/1959 | DeSeversky | 99/345 |
| 2,933,376 | 4/1960 | McBrien | 141/24 |
| 3,039,500 | 6/1962 | Goldberg | 141/26 |
| 3,323,689 | 6/1967 | Elmore | 222/209 |
| 4,043,341 | 8/1977 | Tromovitch | 222/209 |
| 4,129,066 | 12/1978 | Corley | 99/345 |
| 4,346,836 | 8/1982 | Nagel | 126/374 |
| 4,389,926 | 6/1983 | Joyner | 99/495 |
| 5,195,427 | 3/1993 | Germano | 99/472 |

Primary Examiner—Timothy F. Simone
Attorney, Agent, or Firm—Staas & Halsey

[57] ABSTRACT

A manually operable device for metering air through a valve system for drawing into, retaining and evacuating material from a chamber having a first conveying mechanism operatively connected to the chamber and exposed to the atmosphere for transporting the material, a second air conveying mechanism operatively connected to the chamber, a manually operable device for moving air within the second conveying mechanism and a valve mechanism operatively connected to the second conveying mechanism which when in a first position upon actuation of the manually operable mechanism moves air creating a partial vacuum within the chamber causing material to be drawn into the chamber, and when in a second position upon actuation of the manually operable mechanism causes air to be introduced under positive pressure into the chamber evacuating the material from the chamber into the first conveying mechanism.

7 Claims, 4 Drawing Sheets

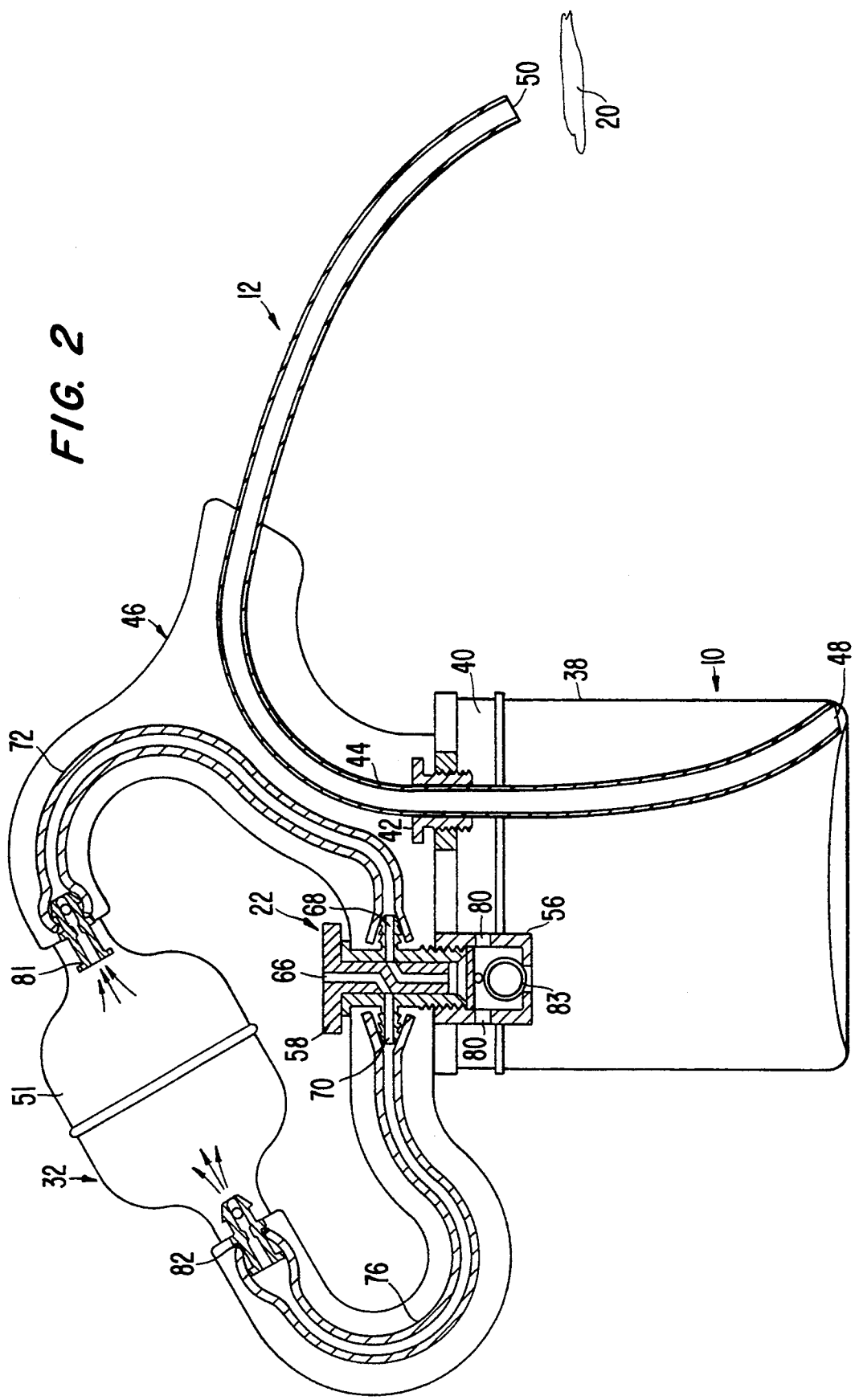

5,394,789

MANUALLY OPERABLE DEVICE FOR METERING AIR THROUGH A VALVE SYSTEM FOR DRAWING INTO, RETAINING AND EVACUATING MATERIAL FROM A CHAMBER

BACKGROUND AND SUMMARY OF INVENTION

The present invention relates to a manually operable device for selectively drawing into, retaining and evacuating material from a container.

For many years there has existed a need to collect and retain and/or to evacuate external substances to and from chambers with the use of a simple and inexpensive, hand-powered metering device. Consistent with the broad principles of the present invention it is possible to control a "problematic fluid" via the ability to collect it from difficult-to-reach places, contain the fluid, and if desired, dispose of all or a portion thereof while observing, separating and adding to or removing some portion of the fluid. The expression "problematic fluid" is used herein to mean that some element or characteristic of the fluid, such as heat, causticity, grain or grit emulsion, acidity, bruisability, suspended composition or other problem, precludes using a pump to directly move the fluid.

With the present invention a simple, manually operable device is employed which meters air through a valve system to create within a collection chamber either a partial vacuum or positive pressure, such that external objects and materials can be drawn into the chamber and collected therein, or in the alternative, expelled under pressure from the chamber. In this manner air movement, promoted by a manually operable mechanism, controls through a valve the flow of fluid into and out of the chamber of the container independently of the movement of the fluid. Consistent with the principles and scope of the present invention, the manually operable device creates, alternatively, positive pressure or a partial vacuum in relation to ambient pressure. The present invention creates a partial vacuum in the reservoir causing the external objects and materials to enter the reservoir of the container, or in the alternative, creates a positive pressure in the reservoir causing external objects and material contained therein to be expelled to the atmosphere.

BRIEF DESCRIPTION OF THE DRAWINGS

FIG. 2 is an elevational view, partly in section, illustrating a kitchen implement featuring the present invention;

DESCRIPTION OF THE PREFERRED EMBODIMENTS

Figure 1:
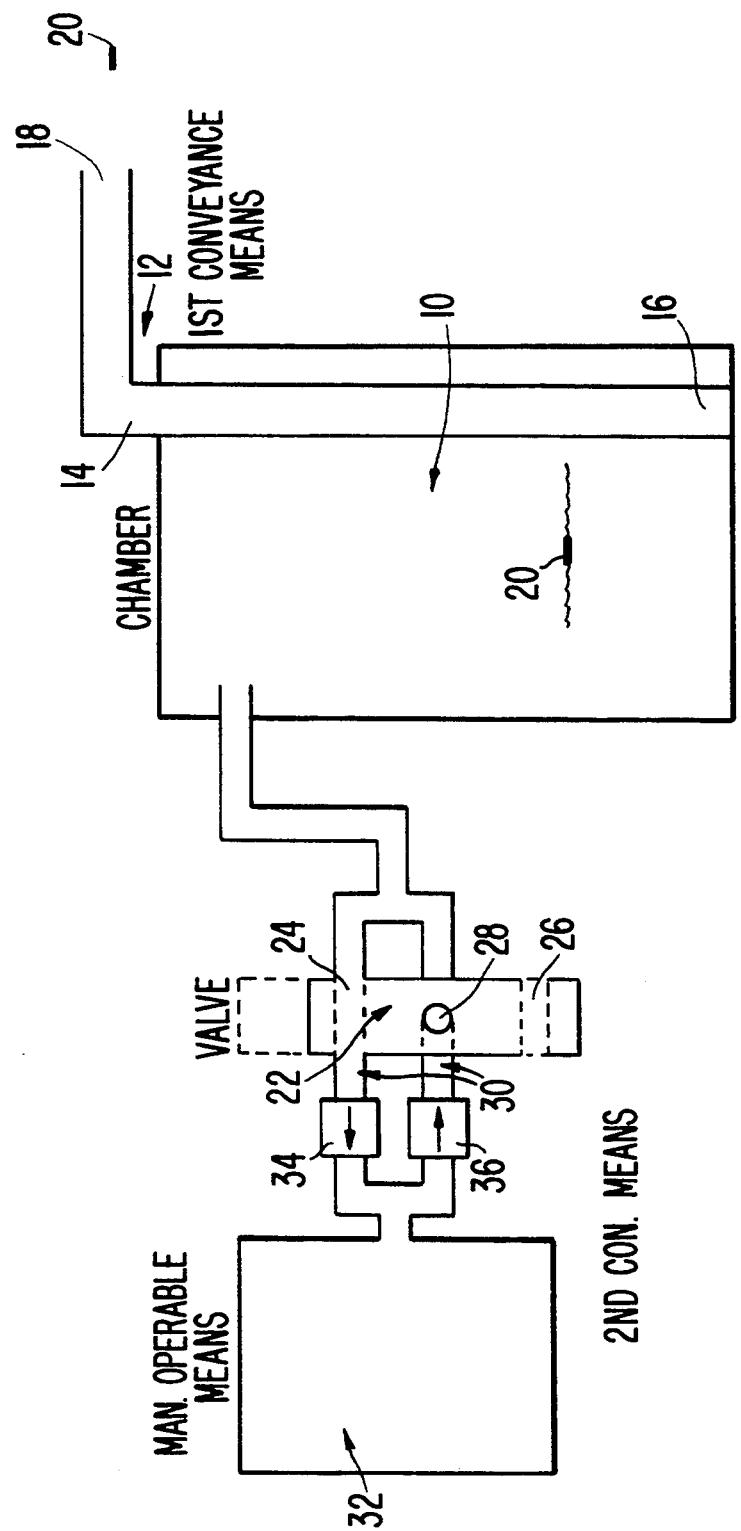
FIG. 1 is a schematic diagram illustrating the principles of the present invention.

There is schematically illustrated in FIG. 1 a chamber 10 provided with a first conveying system 12 consisting of a conduit 14 having one end 16 near the bottom of the chamber 10 and a second end 18 directly exposed to the atmosphere. As will be apparent hereinafter, in its broader aspects the present invention is designed both to withdraw materials and objects 20 into the end 18 of the pipe 14 and downwardly through the pipe 14 for discharge into the chamber 10; to retain the collected materials and objects 20 within the chamber 10 and, when desired, to expel the materials and objects 20 up the pipe 14 through the opening 18 to the atmosphere.

The reference numeral 22 designates generally a valve mechanism which, as depicted, is arranged for sliding movement. The valve 22 is provided with passageways 24, 26 and 28, described hereinafter.

The reference numeral 30 designates generally a second conveying system in the form of conduit structure for transporting air. The reference numeral 32 designates a manually operable mechanism for moving air along the second passageway 30.

The reference numerals 34 and 36 designate one-way valves within the second conveying system 30 operatively connecting the valve 22 and the manually operable mechanism 32.

When it is desired to collect materials or objects 20 and deposit same within the chamber 10, the valve 22 is moved to the position illustrated in FIG. 1. As mechanism 32 is squeezed air is expelled outwardly therefrom through the one-way valve 36 into the second conveying system 30 and then into the conduit 28 afterwhich the air is discharged to the atmosphere. The action of the operating mechanism 32 simultaneously creates a partial vacuum causing air to move through the one-way valve 34 creating a partial vacuum in the passageway 24 and the chamber 10, causing the materials and objects 20 to be drawn into the conduit 14 for deposit within the chamber 10.

When it is desired to propel the materials and objects 20 from the chamber 10 to the atmosphere, the position of the valve 22 is reversed such that the passageway 26 is aligned and operatively connected to the adjacent passageway of the second conveying system 30. In this position, activation of the manually operable mechanism 32 causes air to be propelled through the one-way valve 36 into the passageway 26 and thereafter into the chamber 10. The air pressure then moves the materials and objects upwardly into and through the conduit 14, thus causing the materials and objects 20 to move out of the chamber 10 to the atmosphere.

Application of the principles of the present invention to a kitchen implement will now be described with reference to FIG. 2. The kitchen implement performs as a baster, skimmer, separator, cooler/stock container, a portable, hot-liquid dispenser and a transporter. All of these functions may be performed with a single, simple-to-use implement adapted particularly for use in extracting fat from food preparations, including basting fluids, skimming fat from soups or other hot mixtures, making fat-reduced gravy, when browning or parboiling meats, and the like. The kitchen implement featuring the present invention provides for splatter and dribble free collection, transportation, storage, or dispensation of hot and cold liquids in measured quantities and, also, can be used to collect, mix and dispense or serve liquids in the manner of gravy boats, salad dressing crucibles, creamers and the like.

As can be seen in FIG. 2, the chamber 10 is defined by a jar 38 suitably provided with a rotatably mounted cover 40. The cover 40 is provided with an air tight seal 42 through which the first conveying means 12, configured as a tube 44, passes. The tube 44 is supported within a frame 46, which is also attached to the top 40, such that one end 48 of the tube 44 is positioned near the bottom of the jar 38 while the other end 50 thereof is positioned a convenient distance outwardly from both the jar 38 and the frame 46.

The manually operable air moving mechanism, generally designed by the reference numeral 32 in FIG. 2, includes a flexible bellows or bulb-like member 51, which may be conveniently squeezed by the user.

Figure 3A:
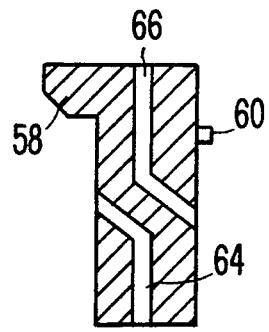
FIG. 3A is a cross sectional view of the inner, moveable member of the valve mechanism.
Figure 3B:
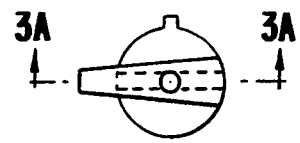
FIG. 3B is a top plan view of the inner, moveable member of the valve mechanism.
Figure 4:
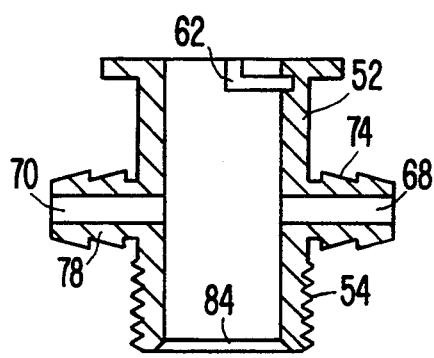
FIG. 4 is a cross sectional view of the barrel of the valve mechanism.
Figure 5:
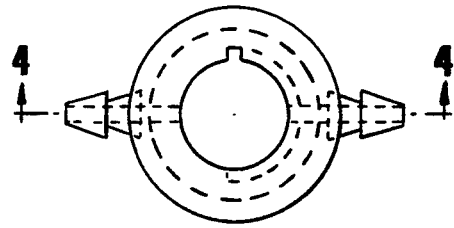
FIG. 5 is a top plan view of the barrel of the valve mechanism.
Figure 6A:
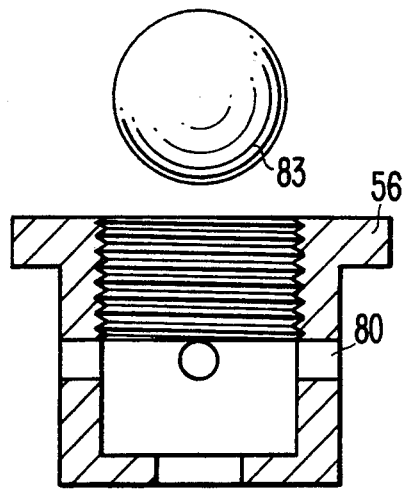
FIG. 6A is elevational view, partly in section, of the cage and floating ball shutoff mechanism.
Figure 6B:
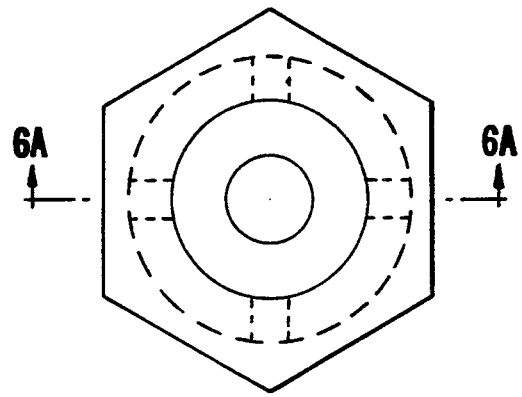
FIG. 6B is a top plan view of the cage and floating ball shutoff.

The valve mechanism 22 (FIG. 1) includes a barrel 52 (FIG. 4) which is provided with threads 54 at the bottom thereof appropriately screwed within a cage 56 (FIG. 5) mounted within the top of the cover 40. The movable member 58 of the valve mechanism 22 is mounted for rotating motion within the barrel 52 and, in this connection, there is provided an index pin 60 (FIG. 3) fat the top of the movable member 58, which is mounted to slide within the slot 62 located at the top of the barrel 52. The inner, movable member 58 of the valve mechanism 22 is provided with first and second passageways 64 and 66, respectively. As can be seen from the drawings, the barrel 52 is provided with passageways 68 and 70, which are variously aligned with the passageways 64 and 66, depending upon the position of the movable member 58.

A first conduit 72 operatively connects the barrel 52, particularly the protruding end 74 thereof, and the manually operable member 51. In similar manner, a second conduit 76 operatively connects the barrel 52, particularly the protruding end 78 thereof and the manually operable member 51. The conduits 72 and 76 are mounted within the frame 46 and the ends thereof adjacent the bellows-like member 51 are expanded about cylindrical locking elements 82.

The cage 56 is provided with a plurality of openings 80 and a hollow, spherical float 83 is mounted within the cage 56.

When it is desired to expel fat-reduced material 20 from the jar 38 onto the food being cooked during the basting operation, the valve mechanism 22 is moved to the position illustrated in FIG. 2, from which it will be apparent that depression of the bellows 51 expels air therefrom into conduit 72, afterwhich the air is propelled into passageways 68 and 64 to pass downwardly into the cage 56 and outwardly through the openings 80 into the reservoir of the jar 38. The air exerts pressure on the liquid 20 contained therein propelling same upwardly along the tube 44 eventually leaving the end 50 of the tube 44. During this operation, the interior of the bellows 51 is connected to atmosphere through the connecting passageways 76, 70 and 66.

When it is desired to move fatty material into the jar, the valve mechanism 22 is rotated to the opposite position (see FIG. 2), at which time depression of the bellows 51 once again causes air to enter and move along the passageway 72 entering the passageway 66 and outwardly to atmosphere. Simultaneously therewith, the depression of the flexible bulb 51 draws a vacuum causing air within the conduit 76 to move into the bellows 51, in turn pulling a vacuum on the inside of the jar 38 in view of the fact that there is now direct communication and air flow between the inside of the jar 38 and the passageway 64 (FIG. 3) through the opening 80. This action of creating a partial vacuum draws fatty substance 20 into the open end 50 of the tube 44 from which it moves downwardly and is deposited within the jar 38.

As the level of liquid of fatty substance 20 rises within the jar 38, the float valve 83 eventually rises into abutting relationship against the seat 84 of the barrel 52 thus terminating operation and avoiding overflow.

Figure 7:
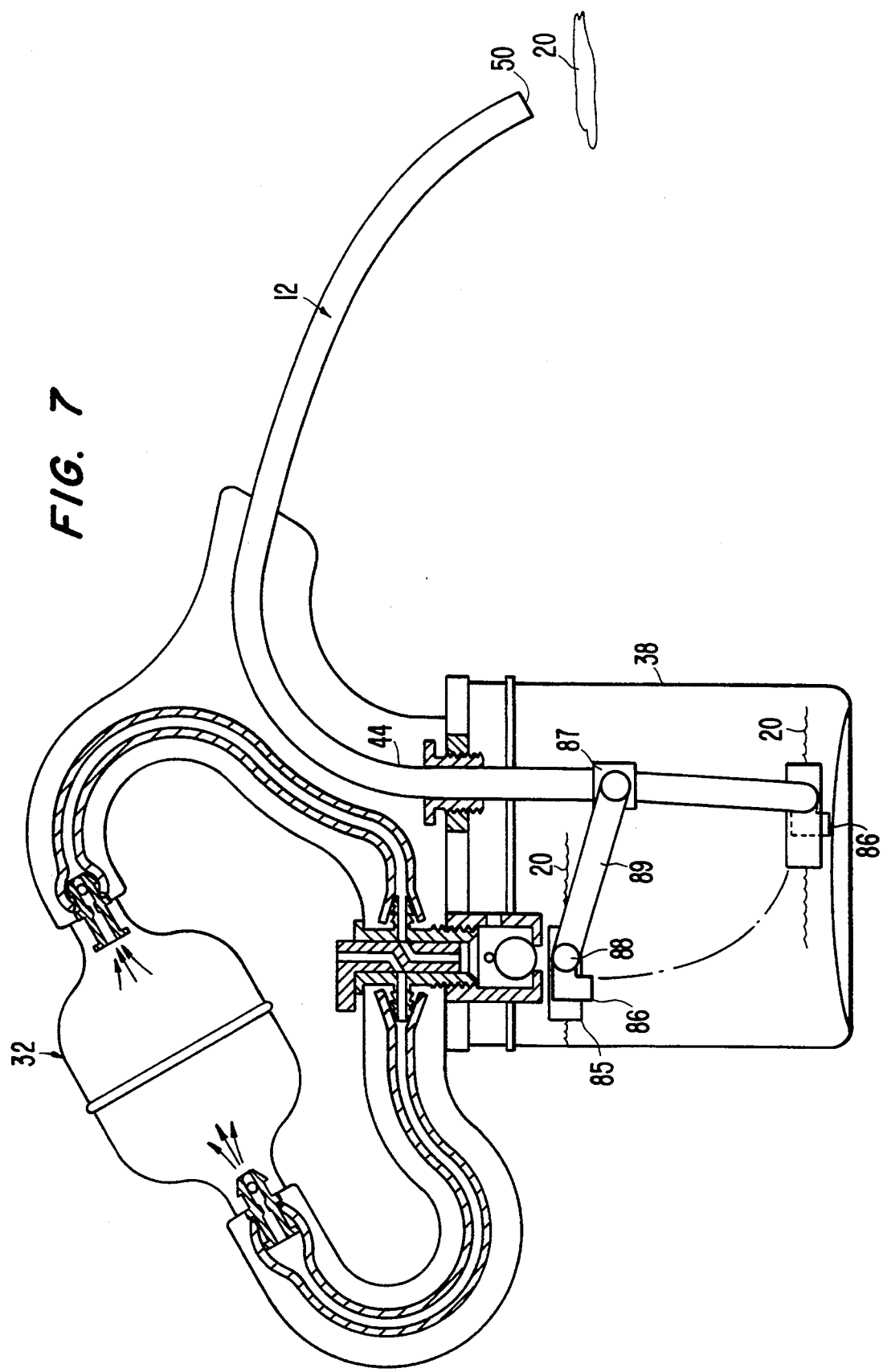
FIG. 7 is an elevational view, partly in section, of a second embodiment of a kitchen implement featuring the present invention.

The second embodiment of the present invention is illustrated in FIG. 7. In the course of dispersing material and objects 20 from the jar 38, there sometimes arises the need to expel material or objects that float to the top of the fluid in that they are the target or purpose for using the implement. To facilitate that end the first conveying means is provided with junction 87 midway in the tube 44 inside the jar 38 mounted with a swing tube 89 jointed at both ends 88 to swivel up and down as the fluid level changes. The floating head 85 supports both the inlet tube 86 at the surface of the material and objects 20 and the swing tube 89 at the swing joint 88 thereby removing floating objects or lighter material from the top of fluid 20 from open end of inlet 86 through tube 89 to 44 and out the open end 50 to atmosphere.

Although application of the present invention to a kitchen implement has been disclosed, it will be readily apparent that the principles of the present invention are equally applicable in collecting, retaining, mixing and dispensing a wide variety of materials in homes, garages, garden centers, shops, schools, laboratories, production facilities, and the like. Wherever fluids are used the present invention simplifies the ability to move, mix, collect and dispense a range of problematic, unstable or dangerous fluids.

While we have described a preferred embodiment of the present invention, it should be understood that various changes, adaptations and modifications will be made therein without departing from the spirit of the invention and the scope of the following claims.

I claim:

1. A device for selectively drawing into, retaining and evacuating material from a chamber, comprising:
   first conveying means operatively connected to said chamber and exposed to the atmosphere for transporting the material,
   second air conveying means operatively connected to said chamber,
   manually operable means for moving air within said second conveying means, and
   valve means operatively connected to said second conveying means which when in a first position upon actuation of said manually operable means moves air creating a partial vacuum within said chamber causing material to be drawn into said chamber, and when in a second position upon actuation of said manually operable means causes air to be introduced under positive pressure into said chamber evacuating material from said chamber into said first conveying means.

2. A device as in claim 1, wherein said manually operable means comprises a hollow flexible bulb.

3. A device as in claim 1, wherein said manually operable means comprises a hollow bellows.

4. A device as in claim 1, wherein said chamber comprises the interior of a container, and wherein said first conveying means comprises a conduit extending from a point outside of said container to a position in the proximity of the bottom of said container.

5. A device as in claim 1, wherein said chamber comprises the interior of a container, and wherein said first conveying means comprises a conduit, means mounting set conduit to pivot from the bottom to a position near the top of said container, and a float attached to said conduit permitting the exposed end thereof to follow the level of material within said container.

6. A device as in claim 1, wherein said chamber comprises the interior of a container, and wherein said first conveying means comprises a conduit extending from a point outside of said container to a position in the proximity of the bottom of said container.

7. A device as in claim 6, wherein said inner, moveable valve member includes two passageways, and wherein said second air conveying means operatively connects said manually operable means for moving air to said passageways of said inner, moveable valve member.

* * * * *